Nov. 3, 1925.            1,559,922
R. A. WALSH
COMBINED MILK BOTTLE STOPPER AND POURING SPOUT
Filed Sept. 25, 1924
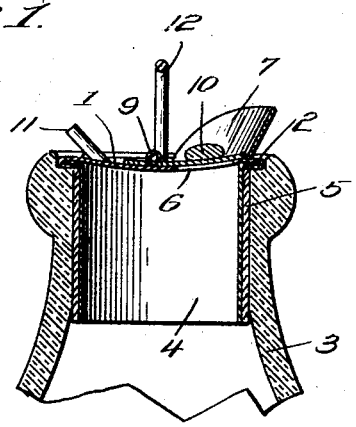
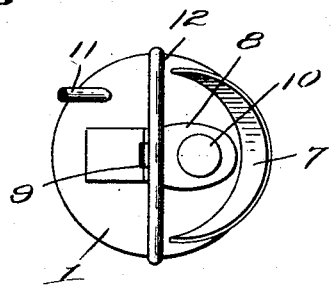
Inventor
R. A. Walsh.
By Clarence A. O'Brien
Attorney Patented Nov. 3, 1925.

1,559,922

UNITED STATES PATENT OFFICE.

RICHARD A. WALSH, OF DAYTON, OHIO.

COMBINED MILK-BOTTLE STOPPER AND POURING SPOUT.

Application filed September 25, 1924. Serial No. 739,845.

*To all whom it may concern:*

Be it known that I, RICHARD A. WALSH, a citizen of the United States, residing at Dayton, in the county of Montgomery and State of Ohio, have invented certain new and useful Improvements in a Combined Milk-Bottle Stopper and Pouring Spout, of which the following is a specification.

This invention relates to improvements in milk bottle stoppers and has for its principal object to provide a simple and efficient device which resides in the provision of a combined milk bottle stopper and pouring spout.

One of the important objects of the present invention is to provide a device of the above mentioned character, which may be readily and easily placed in use by removing the ordinary disc stopper of the milk bottle, the device being of such construction as to prevent any foreign substance gaining access to the contents of the milk bottle.

A further object of the invention is to provide a combined milk bottle stopper and pouring spout of the above mentioned character, wherein the same is of such construction as to permit the milk within the bottle to be readily and easily poured therefrom, a weighted closure being associated with the outlet opening in the stopper for normally keeping the same sealed.

A further object is to provide a combined milk bottle stopper and pouring spout of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a fragmentary sectional view through the neck of a milk bottle equipped with the combined milk bottle stopper and pouring spout embodying my invention showing the same in section, and Figure 2 is a top plan view of the device.

In the drawing, wherein for the purpose of illustration is shown the preferred embodiment of my invention, the numeral 1 designates a metallic disc which is adapted to rest on the annular seat 2 formed in the neck of a milk bottle 3 in the manner well known in the art. The disc 1 is of a diameter equivalent to the diameter of the usual paper or card board disc employed for providing a stopper milk bottle. Associated with the metallic disc 1 is the tubular member 4 which is adapted to extend downwardly within the neck of the milk bottle 3 for the purpose of providing a snug fit, a cork or other impervious lining 5 is cemented on the outer face of the tubular member and is adapted to be interposed between the neck of the bottle and the tubular member in the manner as clearly illustrated in Figure 1. This construction will prevent the contents of the bottle from leaking.

The disc 1 is provided with an outlet opening 6 and extending upwardly from the disc adjacent the opening 6 is the pouring spout 7. Whereby the milk may be poured from the bottle in an easy and efficient manner without spilling the same.

The outlet opening 6 is normally closed by means of the pivoted closure 8 which is hinged at 9 on the metallic disc, the same being adapted to extend over the openings shown in Figure 1. A weight 10 is associated with the pivoted closure 8 for assuring the return of the closure to its normal position over the opening. It being understood of course that when the milk bottle is tilted to a pouring position, the closure 8 will be moved out of engagement with the opening 6 whereby the milk may pass through the opening and be discharged from the milk bottle.

An air vent 11 is associated with the disc 1 and the same is of such construction as to provide a means for receiving a match stem or the like for closing the air vent when the milk bottle is setting still. It is of course to be understood that the closure for the air vent is removed therefrom when milk is being poured from the bottle in order to permit the same to flow freely.

A handle 12 in the form of a bail is associated with the disc 1 to facilitate the easy handling of the combined stopper and pouring spout when inserting or removing the same from the neck of the milk bottle. The handle 12 furthermore provides a means whereby the device may be suspended from a hook or the like when not in use.

It will thus be seen from the foregoing description, that a combined bottle stopper and pouring spout has been provided which will not only be santiary but will also provide an efficient closure for the milk bottle and prevent any foreign substance from entering the bottle. Furthermore, the provision of the spout permits the milk to be poured from the bottle in such a manner as to prevent the spilling of the milk.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A combined bottle stopper and pouring spout comprising a disk of a diameter to permit it to rest upon the usual stopper ledge of a common milk bottle neck, said disk being provided with a discharge opening and with an upstanding flange partially surrounding said opening and functioning as a discharge spout, a weighted gravity closed closure pivotally mounted upon the top of said disc and serving to close said discharge opening, a handle carried by said disc, a tubular member depending from the under side of said disc and adapted to telescope into the bottle neck, said tubular member being spaced inwardly from the peripheral edge of said disc, and a sleeve of packing material surrounding said tubular member.

In testimony whereof I affix my signature.

RICHARD A. WALSH.